Jan. 19, 1954 B. S. BUDNY 2,666,410
MACHINE FOR APPLYING SHREDDED MATERIAL TO BAKERY PRODUCTS
Filed Jan. 26, 1948 2 Sheets-Sheet 1

INVENTOR.
BERNARD S. BUDNY
BY
Alfred E. Page
ATTORNEY

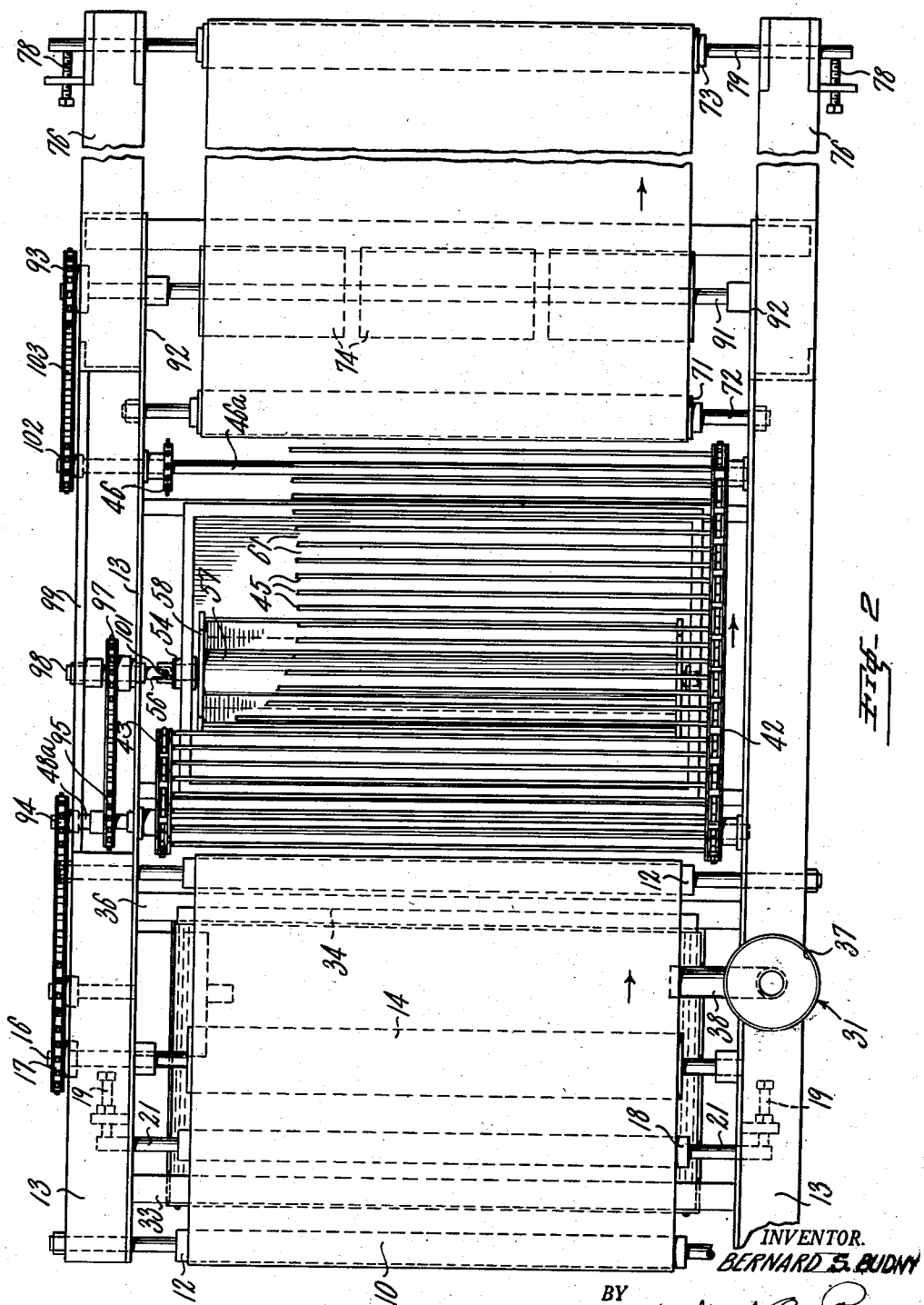

Patented Jan. 19, 1954

2,666,410

UNITED STATES PATENT OFFICE 2,666,410

MACHINE FOR APPLYING SHREDDED MATERIAL TO BAKERY PRODUCTS

Bernard S. Budny, New York, N. Y., assignor to Automatic Roll Machine Company, Inc., New York, N. Y., a corporation of New York Application January 26, 1948, Serial No. 4,223

2 Claims. (Cl. 118—24)

This invention relates to handling apparatus for bakery products and more particularly to novel apparatus for coating one or more surfaces of formed, unbaked products, such as the upper surface of Vienna rolls, with edible comminuted material such as, for example, poppy seeds.

While particularly adapted for coating Vienna rolls, before baking, with poppy seeds, the apparatus is equally adaptable to coating other bakery products with different comminuted materials. For example, the apparatus may be used to coat buns or cakes with shredded coconut or the like; or to apply fine candy particles, for example, to iced surfaces of cake or the like.

Prior arrangements have been proposed for coating bakery products with comminuted material. In such arrangements, the comminuted material is either sifted onto the surface of the bakery products or is thrown against the surface. These arrangements have either been unduly complicated, due to the complex controls required to position the products accurately beneath the sifting apparatus, or have been wasteful of the material. This last factor is of importance, particularly with poppy seeds, due to the scarcity and high price thereof.

The baking art, due to higher costs, has been tending more and more toward the use of production line apparatus of the automatic type. The prior art machines for coating bakery products with comminuted material have not been readily adaptable for continuous, automatic production of bakery products.

The coating apparatus of the present invention, on the other hand, is well adapted for incorporation in a production line. When used, for example, to coat Vienna rolls with poppy seeds, it may be arranged to receive continuously these rolls as formed by the apparatus described in my copending application, Serial No. 734,812, filed March 14, 1947, for "Automatic Roll Forming Machine," now abandoned.

The present apparatus includes a first conveyor arranged to receive formed bakery products in the inverted position, and means to wet the conveyor carrying surface to correspondingly wet the normally upper surfaces of the rolls thereon. The first conveyor discharges the wetted rolls onto a second conveyor having interstices in its carrying surface, and means are provided to force batches of comminuted material through such interstices and into contact with the wetted surfaces of the rolls. The thus coated rolls are fed to a discharge conveyor, from which they are placed in baking pans.

More specifically, the apparatus of the present invention includes a first conveyor means having its carrying surface disposed at a level sufficiently lower than the discharge plane of the roll forming machine that the rolls will fall onto such conveyor means in the inverted position. Means, such as a liquid receiving tank disposed in the return path of such first conveyor means, are provided to wet the carrying surface thereof, preferably with water. Correspondingly, the normally upper surfaces of the rolls on the carrying surface are wetted. Such first conveyor means preferably comprises a leather fabric or rubber belt.

The first conveyor discharges the wetted rolls onto a second conveyor having interstices in its carrying surface. For example, the second conveyor may comprise a pair of chains interconnected by transversely elongated, longitudinal spaced links. Alternatively, the second conveyor could comprise a wire mesh, perforated belt or the like.

Immediately beneath the carrying rim of the second conveyor, there is disposed a container for comminuted material, such as poppy seeds. A movable means, such as a paddle wheel, in the container continuously forces batches of the material upwardly between the interstices of the second conveyor and into contact with the wetted, normally upper, surfaces of the inverted rolls. Some of the material adheres to the upper surfaces of the rolls, thus coating the latter with poppy seeds, for example. The coated rolls are then discharged onto another conveyor, from which they may be removed into baking pans.

It is accordingly among the objects of this invention to provide novel apparatus for coating bakery products with comminuted material.

Another object is to provide such apparatus which is economical of material, efficient in operation, and adapted for use in a continuous production line.

A further object is to provide such apparatus including means for wetting a surface or surfaces of bakery products and means for forcing comminuted material into contact with the wetted surfaces to coat the same.

These, and other objects, advantages and novel features of the invention will be apparent from the following description and accompanying drawings. In the drawings:

Fig. 2 is a plan view, partially broken away to illustrate certain features, of such preferred embodiment.

Figure 1:
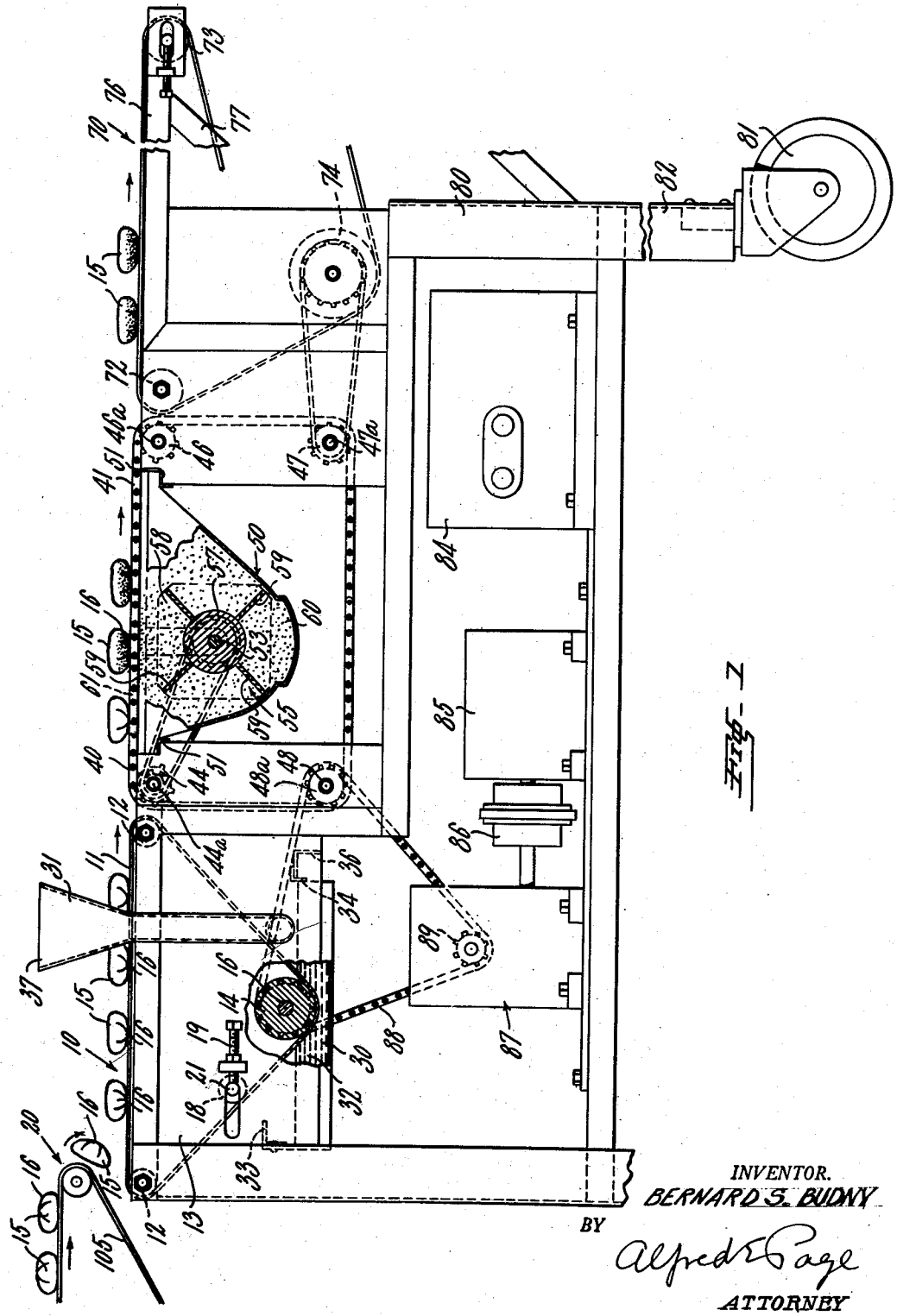
Fig. 1 is a side elevation view, partly in section of a preferred embodiment of the invention.

Referring to the drawings, the apparatus of the invention includes a first conveyor 10 arranged to receive formed, unbaked bakery products, such as Vienna rolls 15, in the inverted position. Conveyor 10 may receive such products from an automatic roll forming machine 20 of the type shown and described in my said copending application. For this purpose, the carrying surface 11 of conveyor 10 is disposed sufficiently below the discharge of machine 20 that the rolls 15 will fall onto surface 11 in the inverted position, with their normally upper or top surfaces 16 engaging carrying surface 11.

Means are provided for wetting surface 11 of conveyor 10 to correspondingly wet normally upper surfaces 16 of rolls 15. This means may comprise a liquid tank 30, adapted to hold a supply of water, and filled through a spout 31. Tank 30 is disposed in the under or return path of conveyor 10 so that surface 11 of the conveyor is wet by the water in tank 10.

Conveyor 10 discharges the wetted rolls 15 onto a second conveyor 40 having interstices in its carrying surface 41. Directly beneath conveyor surface 41 is a container 40 having movable means, such as a paddle wheel 55, therein adapted to force batches of comminuted material 60, such as poppy seeds, between the interstices of surface 41 and into contact with wetted, normally upper surfaces 16 of rolls 15 thereon.

Some of the material 60 adheres to wetted surfaces 16, coating the latter, and the excess material 60 falls back into container 50 for re-use. Conveyor 40 delivers the coated rolls 15 to a discharge conveyor 70 from which the coated rolls are removed to baking pans. Conveyor 70 is, for reasons of space, shown in Figs. 1 and 2 as broken away between its ends.

Referring more particularly to the drawings, the entire apparatus is mounted on a frame 80 which is preferably movable on rollers 81 on its vertical legs 82. A lower frame member 83 supports a control box 84 for a motor 85 which acts as a prime mover for the elements of the apparatus.

Conveyor 10 may comprise a leather, fabric or rubber belt passing over a pair of upper rollers 12 mounted in frame side members 13. The return portion of conveyor 10 passes over a roller 14 fixed on a shaft 16 rotatably mounted in side members 13 and having a sprocket 17 on one end. Roller 14 is disposed in tank 30 so that conveyor 10 has its surface 11 wetted by the water 32 in tank 30. Belt conveyor 10 is kept taut by a roller 18 adjustable along side members 13 by bolts 19 engaging shaft 21 of roller 18.

Tank 30 has one end suitably supported on a frame cross member 33 and its other end is provided with an angle 34 resting on a cross member 36. Spout 31 has an enlarged mouth 37 and a horizontal extension 38 leading inwardly of frame 80 to a point over tank 30. Spout 31 is supported on a frame side member 13.

Conveyor 40, which receives rolls 15 from conveyor 10, comprises a pair of chains 42, 43 extending over four pairs of transversely spaced sprockets 44, 46, 47, 48, each pair of sprockets being secured to a shaft 44a, 46a, 47a, 48a, respectively, rotatably mounted in bearings in the frame side members. The links of chains 42, 43 are commonly interconnected by transversely elongated, longitudinally spaced rollers or rods 45.

A pair of rails 51 extend transversely of the frame beneath the upper rim of conveyor 40, and slidably receive container 50 which has lips 52 resting on rails 51. Container 50 may thus be slid laterally from beneath conveyor 40 for refilling with comminuted material 60.

A shaft 53 is rotatably mounted in the opposite end walls of container 50, and has a collar 54 on one end provided with an axial notch or slot 56 for a purpose to be described. Paddle 55 comprises an elongated hub 57 having a pair of plates 58 on either end. Extending between plates 58 are four, equally spaced paddles 59. When shaft 53 is rotated, paddles 59 force batches of comminuted material 60 upwardly through the interstices or spaces 61 between rods 45 and thus into contact with wetted surfaces 16 of rolls 15.

The discharge conveyor 70, which is preferably a belt, is trained over a first upper roller 71 on a shaft 72 rotatable in frame side members 13, a second upper roller 73 and a lower roller 74. Roller 73 is adjustably mounted in the outer end of a frame extension comprising horizontal members 76 and diagonal braces 77. A pair of belts 78 engage shaft 79 of roller 73 to take up the slack in belt conveyor 70. Roller 74 is larger than rollers 72, 73 and is fixed to a shaft 91 rotatably mounted in vertical frame members 92 and having a sprocket 93 on one end.

An important feature of the invention is the driving mechanism which maintains conveyors 10, 40 and 70, and paddle 55, moving in synchronism. A coupling 86 connects the drive shaft of motor 85 to a gear reduction unit 87. A chain 88 extends around an output sprocket 89 of unit 87, sprocket 17 on shaft 16 and a sprocket 94 on shaft 48a. Thus, conveyors 10 and 40 are driven in unison.

Shaft 48a has a sprocket 95 fixed thereto and a chain 96 extends over sprocket 95 and a sprocket 97 on a shaft 98 rotatably mounting in bearings on side frame member 13 and a plate 99. Shaft 98 is aligned with shaft 53 of paddle 55 and has a pin 101 engageable in notch 56. Thus, paddle 55 is rotated in synchronism with the movement of conveyor 40. When container 50 is laterally withdrawn from beneath conveyor 40, collar 54 disengages shaft 98 permitting paddle 55 to be withdrawn as a unit with container 50. When the latter is replaced, pin 101 slips into notch 56 of collar 54 to connect the paddle to the driving mechanism.

Shaft 47a has a sprocket 102 on the outer end, and a chain 103 is trained over sprocket 102 and sprocket 93 on shaft 91 of roller 92. Consequently, discharge conveyor 70 is operated in synchronism with conveyors 10 and 40. Thus, the three conveyors and paddle 55 are driven in synchronous relation with each other.

The described apparatus comprises a novel mechanism for coating bakery products with comminuted material. The upper surfaces 16 of rolls 15 are wet by contact with the wet surface 11 of conveyor 10, and thus the material 60, forced through the interstices of conveyor 40 by paddle 55, readily adheres to surfaces 16. The excess material 60 simply falls back into container 50.

Due to its automatic, continuous operation, the apparatus may be used in a continuous production line, receiving the unbaked rolls or the like as formed, coating them with comminuted material, and delivering the coated rolls to the point where they are placed in baking pans. In this connection, the automatic roll forming machine 20 has been shown only diagrammatically to illustrate the vertically spaced relation of conveyor 10 whereby the rolls fall onto conveyor 10 in the inverted position. Actually, the discharge conveyor 105 comprises the holding cups shown in my copending application.

While a specific embodiment of the invention has been shown and described in detail to illustrate the application of the principles thereof, it will be understood that the invention may be otherwise embodied without departing from such principles.

What is claimed is:

1. An apparatus for applying edible comminuted material to the wetted surface of bakery products comprising a frame, a foraminous conveyor mounted on the frame including spaced conveyor elements providing openings therebetween for receiving the products with the wetted surface disposed downwardly, driving means for the conveyor mounted on the frame, a container for comminuted edible material mounted on the frame beneath the product carrying run of the conveyor; said container having an outgoing curved side wall extending from the bottom thereof and a side wall opposite the outgoing side wall sloped downwardly toward the bottom thereof, a paddle rotatably mounted in said container on an axis parallel to such conveyor run and normal to the direction of conveyor travel, said paddle being in operative relation to wall portions of said container for moving batches of the comminuted material upwardly toward such conveyor and between the openings therein into engagement with the wetted surfaces of the products; and a driving connection between said paddle and said driving means.

2. An apparatus for applying edible comminuted material to the wetted surface of bakery products comprising a frame, a foraminous conveyor mounted on the frame including spaced conveyor elements providing openings therebetween for receiving the products with the wetted surface disposed downwardly, driving means for the conveyor mounted on the frame, a container for comminuted edible material laterally removably mounted on the frame beneath the product carrying run of the conveyor; said container having an outgoing curved side wall extending from the bottom thereof and a side wall opposite the outgoing side wall sloped downwardly toward the bottom thereof, a paddle rotatably mounted in said container on an axis parallel to such conveyor run and normal to the direction of conveyor travel, said paddle being in operative relation to wall portions of said container for moving batches of the comminuted material upwardly toward such conveyor and between the openings therein into engagement with the wetted surfaces of the products; and a driving connection between the shaft of said paddle and said driving means, said driving connection including clutch means engageable when the container is mounted on the frame and disengageable by removal of the container from the frame.

BERNARD S. BUDNY.

References Cited in the file of this patent

UNITED STATES PATENTS

| Number | Name | Date |
| --- | --- | --- |
| 345,186 | Stauffer | July 6, 1886 |
| 358,358 | King et al. | Feb. 22, 1887 |
| 1,162,603 | Hallberg | Nov. 30, 1915 |
| 1,606,721 | Rihl | Nov. 9, 1926 |
| 1,908,539 | Quick | May 9, 1933 |
| 1,966,268 | Steffen | July 10, 1934 |
| 2,119,909 | Ferry | June 7, 1938 |
| 2,347,164 | Petrilli | Apr. 18, 1944 |